US005959416A

United States Patent [19]

Clutter et al.

[11] Patent Number: 5,959,416

[45] Date of Patent: Sep. 28, 1999

[54] METHOD AND APPARATUS FOR CONTROLLING A LIFTING MAGNET OF A MATERIALS HANDLING MACHINE

[75] Inventors: Ronald W. Clutter, Geneva; Kenneth J. Chlad, Chagrin Falls; Timothy L. Cooper, Marion; Charles A. Robinson, Galion, all of Ohio

[73] Assignee: Caterpillar Inc., Peoria, Ill.

[21] Appl. No.: 08/813,563

[22] Filed: Mar. 7, 1997

[51] Int. Cl.$^{6}$ ................................ H02P 9/10; B66C 1/08

[52] U.S. Cl. .......................... 318/141; 318/145; 318/158; 361/145; 414/606; 414/737

[58] Field of Search .................................... 318/140–145, 318/158; 294/65.5; 414/606, 737, 797.1; 361/143, 144, 145

[56] References Cited

U.S. PATENT DOCUMENTS

| | | |
|---|---|---|
| 2,257,361 | 9/1941 | Yorkey . |
| 2,504,026 | 4/1950 | Krause et al. . |
| 2,622,750 | 12/1952 | Ehlers . |
| 2,748,322 | 5/1956 | Oswald . |
| 2,858,485 | 10/1958 | Seeger . |
| 3,237,056 | 2/1966 | Puy . |
| 3,561,541 | 2/1971 | Woelfel . |
| 3,629,663 | 12/1971 | Butkus . |
| 3,653,706 | 4/1972 | Kashiwagi et al. . |
| 3,708,685 | 1/1973 | Miller et al. . |
| 4,323,329 | 4/1982 | Chlad . |
| 5,325,260 | 6/1994 | Repetto . |

OTHER PUBLICATIONS

"ASME B30.25 Scrap and Material Handlers", Chapter 25–0, Section 25 —1.8.1, Lifting Magnets, 1992.

"For D.C. Lifting Magnets: Safety Disconnect Switch", Oct., 1991, NAI Corp., Geneva, Ohio.

"Ohio Model RD–1W Automatic Drop Magnet Controller", Ohio Magnetics, Nov., 1994.

"Euclid Lifting Magnet Controllers Type 4291 Automatic Discharge", Hubbel Industrial Controls, Inc., Jul., 1990.

"Lifting Magnet Control", Square D Company, Mar., 1993.

SoftTouch® Magnet Controller, Version 5.0a, International Electrical Systems, Inc. Lumberton, Texas. (Brochure). (No date).

SoftTouch® Lifting Magnet Controller, International Electrical Systems, Inc. Lumberton, Texas.(Brochure). (No date).

NorthStar Magnet Generator Control System™, Northwest Magnet Industrial Controls, Portland, Oregon. (Brochure). (No date).

Northwest Magnet Dual Voltage Magnet Generator Controller, Instruction Manual, Northwest Magnet Industrial Controls, Portland, Oregon. (No date).

*Primary Examiner*—Bentsu Ro

*Attorney, Agent, or Firm*—Fay, Sharpe, Beall, Fagan, Minnich & McKee

[57] ABSTRACT

An apparatus and method for controlling a lifting magnet (12) of a materials handling machine (10) to eliminate arcing between contacts (70–80) within the magnet controller (26) as well as large voltage spikes. The controller (26) selectively excites the shunt field windings (66,68) of a direct current generator (22). The magnitude and direction of the current passing through the shunt field windings (66,68) is varied by the magnet controller (26) to control the magnitude and polarity of the voltage at the generator output (23). The armature (60) of the generator (22) is rotatably driven by a hydraulic motor at an essentially constant speed to minimize voltage variations at the output (23) of the generator (22). The magnet controller (26) includes a programmable logic controller (40) which selectively opens and closes the contactors (70–80) within the controller (26). The programmable logic controller 40 is also connected to indicator lamps (L1–L5) within the operator's cab (14) of the materials handling machine (10), and selectively illuminates the lamps (L1–L5) to provide an operator of the apparatus with information regarding the status of the magnet control system (27) including the controller (26). A drop time adjustment control (81) is also positioned in the operator's cab (14) and operable to vary the drop time of the magnet controller (26).

19 Claims, 12 Drawing Sheets

METHOD AND APPARATUS FOR CONTROLLING A LIFTING MAGNET OF A MATERIALS HANDLING MACHINE

BACKGROUND OF THE INVENTION

The present invention relates to a method and apparatus for controlling a lifting magnet of a materials handling machine. It finds particular application in conjunction with lifting magnets used on cranes and other prime movers in the steel and scrap metal industries.

Lifting magnets are commonly used in the materials handling industry to lift and move magnetic materials. For example, in the steel industry, lifting magnets are used to move intermediate products and finished goods. Also, in the scrap metal industry, lifting magnets are commonly attached to cranes and other prime movers and used to load, unload, and otherwise move scrap steel and other ferrous metals.

While lifting magnets have been in common use for many years, the systems used to control these lifting magnets remain relatively primitive. Known control systems operate to selectively open and close contacts that, when closed, complete a circuit between a suitable source of DC electrical power and the lifting magnet. The source of DC power is generally at least 230 volts, and during certain lifting stages, the voltage can reach approximately 275 volts. Additionally, when the polarity of the voltage across the magnet is briefly reversed as is required to "push" a load of metal off of the magnet, voltages commonly reach 500–1000 volts. Thus, opening and closing the contacts during these conditions, to break or complete the magnet circuit, naturally results in arcing across the tips of the contacts and the creation of voltage spikes in the magnet control system.

Arcing between the contacts of known magnet controllers causes burning and wear which eventually leads to the need to replace the contacts. The large variation in voltage also eventually wears out the generator (the typical source for the DC power), the magnet and associated insulation, as well as the cables used to connect the magnet to the generator. To withstand the large voltages and voltage spikes, the magnet, cables, and the control system contacts and other components must be constructed of more expensive materials and must also be made larger in size.

Also, with known magnet control systems, the control system must be matched to the particular magnet being used. For example, the contacts and associated circuitry in a known magnet controller for a 93 inch diameter, 40 kilowatt (kW) magnet must be able to pass approximately 175 Amperes of current and also withstand very large voltage spikes. Such a controller would not be effective when used in conjunction with a 30 inch diameter, 5 kW magnet that draws only 20 Amperes of current. Of course, the components used in a controller for the smaller magnet would not be able to withstand the electrical current and voltage spikes associated with the larger magnet. Thus, with known systems, an operator of a scrap yard or other facility needs to restrict the use of different magnets on the various cranes and other prime movers or must switch the entire control system of the prime mover accordingly. For example, certain known magnet controllers are available in seven different capacities and each is unusable with magnets outside of its operational range. Therefore, a facility using different size magnets must also purchase and maintain a magnet controller suitable for use with each magnet.

Known lifting magnet control systems are not "user-friendly." These control systems do not provide the operator of the magnet with sufficient information regarding the status of the magnet and the magnet control system. For example, known systems do not inform the operator if there exists an unwanted ground in the magnet circuit. Such a ground can damage the magnet or its controller and also adversely affect the operation both the magnet and controller, resulting in dropped loads or other malfunctions. A ground to the chassis of the prime mover can also damage the electronics of the prime mover which are preferably completely isolated from the magnet circuit but which are often grounded to the machine chassis. An unwanted ground in the magnet circuit is also potentially harmful to the generator supplying power to the circuit.

Likewise, known magnet controllers do not monitor the "duty cycle" of the magnet. Duty cycle is the percentage of time that the magnet is energized or "turned on" relative to its total time in operation for a given period of time. Thus, to move a load of steel, an operator may have to energize the magnet 60% of the time, with the remainder of the time being accounted for by the time required to maneuver the magnet and its prime mover, as well as the time when the magnet is deenergized or "turned off" to drop a load. Modern magnets can withstand a 75% duty cycle. If this maximum duty cycle is exceeded, the magnet will be damaged. However, with known magnet control systems, operators are unable to effectively monitor duty cycle and known controllers do not inform the operator if the maximum duty cycle is being exceeded.

Known systems also do not monitor the condition of the generator that supplies DC electrical power to the magnet circuit. If the magnet is being heavily used, it is possible for the generator to overheat. If an operator is unaware of a generator overheating problem, the generator will be damaged. Thus, it would be desirable to provide a magnet control system that continuously monitors the condition of the generator and informs the operator if the generator begins to overheat.

Further, known system do not allow the operator to adjust the "drop time" —the amount of time a reverse voltage is applied to the magnet to reverse its polarity —without assistance or without leaving the operator's cab. Known systems require that this adjustment of drop time be made at the controller itself, which is usually accessible underneath or at the rear of the crane or other prime mover. This is dangerous and difficult, especially due to the fact that test lifts and drops must be made during the adjustment operation. Thus, either the operator of the prime mover machine must repeatedly exit the operator's cab and adjust the drop time or a second person must adjust the drop time in response to commands from the operator. This second person could easily be electrically shocked or otherwise injured should the operator unexpectedly activate the lifting magnet or the prime mover machine itself.

Another drawback associated with known magnet control systems relates to the fact that the generator providing DC power to the magnet is generally driven through a belt-drive connection or using a hydraulic motor which is powered by a hydraulic pump connected to the main engine or an auxiliary engine of the prime mover. Thus, with known systems, an increase or decrease in revolutions per minute (rpm) in the engine driving the generator results in a corresponding increase or decrease in the rpm of the generator armature. This consequently results in an increase or decrease in the DC power output from the generator. While a certain amount of over-voltage from an increase in engine rpm is acceptable, a severe under-voltage, as might occur upon the driving engine becoming "bogged down" or otherwise slowed, can result in a severe drop in generator output to the magnet. If insufficient power is supplied to the lifting magnet, its load could be accidentally dropped. Attempts to utilize conventional voltage regulators to overcome these voltage variations have not been successful. Specifically, conventional voltage regulators cannot withstand the large voltage spikes associated with known magnet controllers.

SUMMARY OF THE INVENTION

According to the present invention, a new and improved method and apparatus for controlling a lifting magnet is provided.

In accordance with first aspect of the present invention, a method of selectively energizing a lifting magnet of a materials handling machine includes connecting a lifting magnet to a voltage output of a separately excited generator that includes shunt field windings. The armature of the generator is rotated and the shunt field windings of the generator are selectively connected to an electrical power source to pass an electrical current through the shunt field windings, thereby exciting the generator and establishing a voltage at the output of the generator.

In accordance with another aspect of the present invention, a controller apparatus for selectively energizing a lifting magnet includes an electrical power input for connection to a voltage output of a generator, and an electrical power output for connection to a lifting magnet. The controller also includes means for selectively connecting shunt fields of a generator connected to the controller to an electrical power source to thereby excite the shunt fields of the generator.

In accordance with still another aspect of the present invention, a materials handling apparatus includes a prime mover and a separately excited generator including a rotatable armature, shunt field windings, and a voltage output for connection to a lifting magnet. Means for rotating the armature of the generator are provided. The apparatus also includes means for selectively exciting the shunt field windings of the generator such that voltage is established at the generator voltage output.

In accordance with yet another aspect of the present invention, a hydraulic manifold includes an inlet for connection to an outlet of a hydraulic pump. The manifold includes a pressure relief valve assembly and a pressure compensated flow control valve assembly downstream relative to said pressure relief valve assembly. The pressure compensated flow control valve assembly includes a flow control valve and a pressure compensator for approximately maintaining a select hydraulic pressure drop from an upstream side of the flow control valve to a downstream side of the flow control valve. The manifold also includes an outlet port connecting the pressure compensated flow control valve assembly to a hydraulic motor.

One advantage of the present invention is the provision of a new and improved apparatus and method for controlling a lifting magnet.

A second advantage of the present invention is the provision of a lower cost and more durable apparatus for controlling a lifting magnet.

Another advantage of the present invention is the provision of an apparatus and method for controlling a lifting magnet that minimize voltage spikes in the magnet circuit.

Still another advantage of the present invention is the provision of an apparatus and method for controlling a lifting magnet that eliminate arcing across the contacts in the magnet controller.

Yet another advantage of the present invention is the provision of an apparatus and method for controlling a lifting magnet that increase the useful life of the magnet, the generator supplying power to the magnet, and the associated circuitry.

A further advantage of the present invention is the provision of an apparatus for controlling a lifting magnet that is usable with a large range of different lifting magnets.

A still further advantage of the present invention is the provision of an apparatus for controlling a lifting magnet that monitors for the existence of an unwanted ground in the magnet circuit and informs the magnet operator of any unwanted ground.

A yet further advantage of the present invention is the provision of an apparatus for controlling a lifting magnet that monitors the duty cycle of the lifting magnet and informs the magnet operator if the maximum duty cycle is exceeded.

Another advantage of the present invention is the provision of an apparatus for controlling a lifting magnet that provides a drop time control mechanism in the operator's cab of the prime mover carrying the lifting magnet.

Still another advantage of the present invention is the provision of an apparatus for controlling a lifting magnet that monitors the temperature of the DC generator supplying electrical power to the magnet and informs the magnet operator if the generator temperature exceeds a select level.

Yet another advantage of the present invention is the provision of an apparatus for controlling a lifting magnet that provides a constant level of DC power to the magnet, independent of the speed of the engine.

Another advantage of the present invention is the provision of a hydraulic fluid manifold that provides a constant flow of hydraulic fluid to a hydraulic motor.

Still other benefits and advantages of the invention will become apparent to those skilled in the art upon reading and understanding the following detailed description.

BRIEF DESCRIPTION OF THE DRAWINGS

The invention may take form in certain components and structures, preferred embodiments of which are illustrated in the accompanying drawings wherein.

DETAILED DESCRIPTION OF THE PREFERRED EMBODIMENTS

Figure 1:
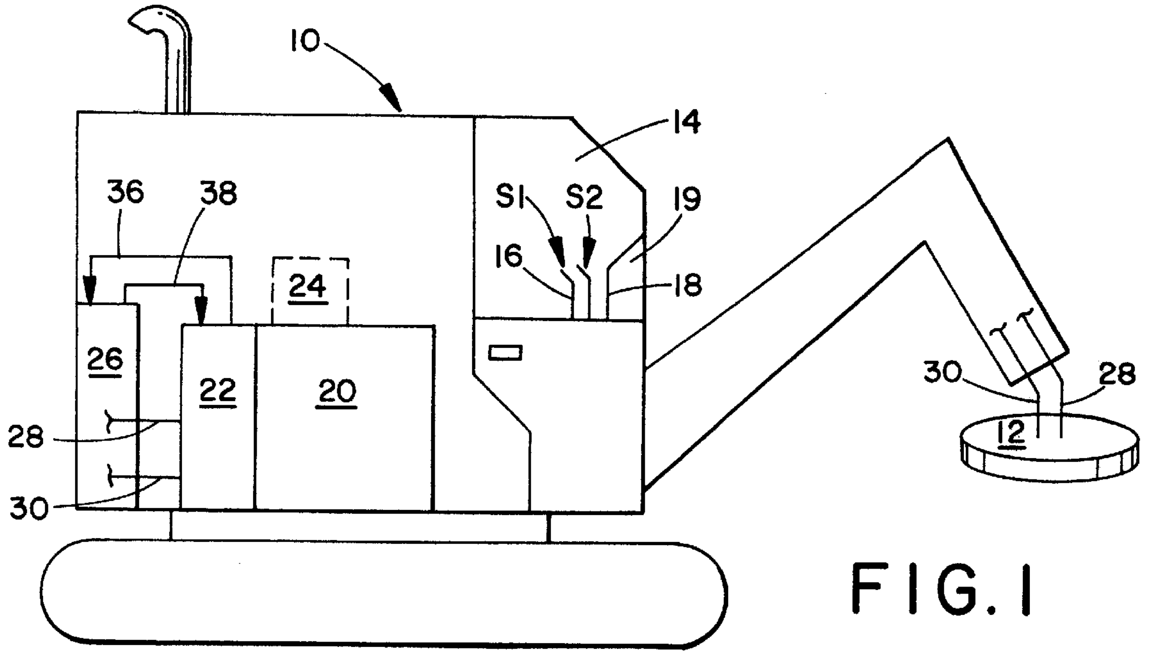
FIG. 1 is a side elevational view of a prime mover including a lifting magnet and a lifting magnet control system in accordance with the present invention.

Referring now to the drawings, wherein the showings are for purposes of illustrating preferred embodiments of the invention only and not for purposes of limiting the same, FIG. 1 shows a prime mover 10 carrying a electromagnetic lifting magnet 12. Although the prime mover 10 is shown herein as a crane, those skilled in the art will recognize that numerous other prime movers are suitable for use in carrying a lifting magnet 12. For example, overhead cranes, tractors and other wheeled vehicles, and excavators are examples of suitable prime movers 10. The present invention is suitable for use to control a lifting magnet 12 carried by any suitable prime mover 10 or a lifting magnet 12 not associated with a prime mover.

The crane 10 includes an operator cab 14 from where an operator controls the crane 10 and the magnet 12. Typically, two hand control levers 16,18 are provided to maneuver the crane 10. The cab 14 includes a control panel 19 that displays information to the operator and also includes various control switches for operator control of the crane 10 and the magnet 12. The crane 10 is powered by an internal combustion engine 20, which may be fueled by gasoline, diesel, or any other suitable fuel. A direct current (DC) electrical generator 22 is driven by the engine 20 or by an auxiliary engine 24 that is optionally provided to power accessories of the prime mover 10. The generator 22 can be driven through a belt-drive or similar connection with an engine 20,24 but preferably is hydraulically driven as is described in detail below.

Figure 2:
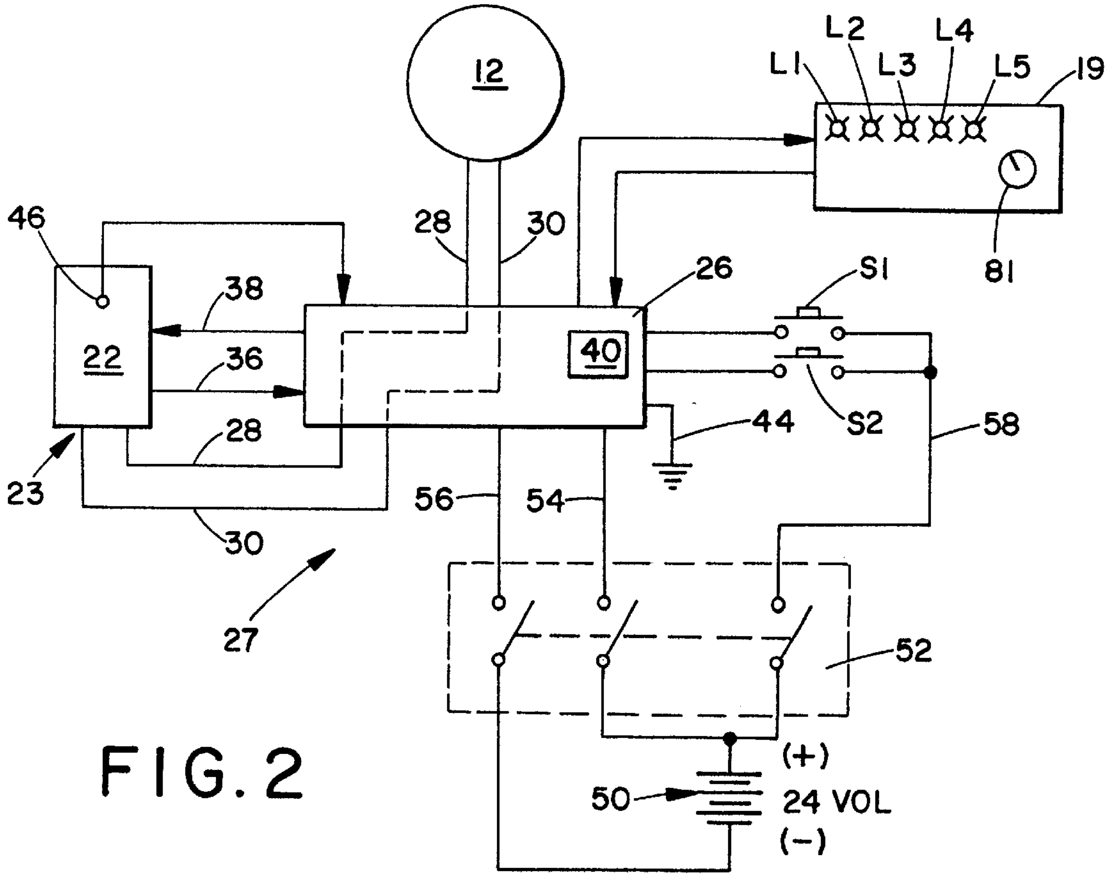
FIG. 2 schematically illustrates a lifting magnet control system in accordance with the present invention.

With reference now also to FIG. 2, a lifting magnet control system 27 includes a magnet controller 26 in accordance with the present invention. The magnet controller 26 interconnects the lifting magnet 12 and the electrical output 23 of the DC generator 22 through cables 28,30 or another suitable electrical connection. The magnet controller 26 selectively energizes and deenergizes the lifting magnet 12 for lifting and dropping operations, respectively. When energized, the lifting magnet 12 attracts and retains ferrous metals and other magnetic substances. When the magnet 12 is deenergized, it is demagnetized. The magnet controller 26 is also connected to the generator 22 through cables 36,38 so that the controller 26 can control the operation of the generator 22 as is described in detail below.

The operation of the magnet controller 26 as shown herein is preferably controlled by a programmable logic controller (PLC) 40 which is programmed to perform various operations as described below in response to the particular input thereto. One suitable PLC 40 is the Micrologix Model 1761 PLC available commercially from Allen-Bradley, Milwaukee, Wis. 53204. Other suitable controllers may be utilized, and those of ordinary skill in the art will also recognize that the PLC 40 may be replaced by discrete components such as contactor relays and the like.

With continuing reference to FIGS. 1 and 2, although the magnet controller 26 is generally located underneath or at the rear of the prime mover 10, it is connected to components in the cab 14 so that the operator can operate the magnet 12, adjust the controller 26, and receive information from the controller 26. Specifically, each control lever 16,18 in the cab 14 includes a push-button or similar switch S1,S2, respectively. One of the switches S1,S2 is manipulated by the operator to cause the magnet controller 26 to energize the magnet 12 for lifting a load. The other of the switches S1,S2 is manipulated by the operator to cause the controller 26 to deenergize the magnet 12 to drop a load.

The magnet controller 26 is also connected to the control panel 19 in the operator's cab 14 of the prime mover 10. The control panel 19 includes various gauges and other instruments that provide information to the operator about the operation of the prime mover 10 and the control system 27. For example, the control panel 19 includes a plurality of visual indicators such as indicator gauges or lights L1, L2, L3, L4, L5 which are selectively illuminated by the PLC 40 in response to various system conditions to ensure operator awareness thereof. For example, the PLC 40 illuminates the light L1 when the magnet is energized. The PLC 40 also monitors the output voltage received from the generator 22 to determine if the voltage is within an acceptable range of approximately 230 volts DC—approximately 275 volts DC, depending upon the operation being performed. An under-voltage condition can result in a dropped load and an over-voltage can damage the magnet and associated equipment. Therefore, if either an under-voltage condition or an over-voltage condition is present, the PLC 40 illuminates the light L2.

To determine if there exits an unwanted ground in the control system 27, the PLC 40 continuously monitors the resistance between the control system 27 and an intentional ground connection 44 to ensure that the resistance to ground 44 is above a known threshold such as approximately 50,000 Ohms (Ω). A resistance to ground 44 less than this value indicates an unwanted ground in the magnet, the cables 32,34, or elsewhere in the system 27. An unwanted ground in the system 27 can result in dropped loads, insufficient reverse current (discussed below) during load drops, and other system malfunctions. Also, an unwanted ground can damage the generator 22 and presents safety concerns. Therefore, the operator is notified of this undesirable condition by the illumination of the light L3.

The PLC 40 also maintains a measurement of the magnet duty cycle. This is accomplished by programming the PLC 40 to record and compare the amount of time the magnet 12 is energized relative to the total amount of time the system 27 is in operation. If the operator is exceeding the recommended duty cycle for the magnet 12, damage to the magnet 12 will result. Therefore, the PLC 40 illuminates the light L4 if the maximum duty cycle is exceeded. In addition to magnet damage, excessively heavy or prolonged use of the magnet 12 can overheat the generator 22 causing permanent damage. Therefore, a thermocouple 46 is positioned in the generator 22. The thermocouple 46 provides the PLC 40 with a temperature signal that represents the temperature of the generator 22. When the PLC 40 receives a signal indicating a generator temperature above an acceptable threshold, the PLC 40 illuminates the light L5 to notify the magnet operator.

In FIG. 2, it can be seen that the lifting magnet control system 27, including the magnet controller 26 includes a power source 50, which is provided, for example, by one or more batteries supplying 24 volts DC. The power source 50 is selectively connected to the magnet controller 26 and to the switches S1,S2 in the cab 14 of the prime mover through one or more switches. Preferably, a single main switch 52 is operable to connect and disconnect both the magnet controller 26 and the switches S1,S2 from the power source 50. When the main switch 52 is closed, the source 50 is connected to the controller 26 through electrical connections 54,56 and to the switches S1,S2 through the electrical connection 58. When the switch 52 is opened, the controller 26 receives no electrical power, and the switches S1,S2 in the cab 14 are disconnected from the circuit. The switch 52 provides a main safety shut-off switch to the magnet control system 27. Preferably, opening the access panel of the controller 26 for maintenance requires the switch 52 to be opened as a safety measure so that the system 27 cannot be activated when the access panel to the controller 26 is open.

It can be seen in FIG. 2, that when the switch S1 is depressed and closed by the operator, a circuit is completed between a first input of the PLC 40 and the source 50, thereby causing the PLC 40 to execute the "lift" cycle of the controller 26. Likewise, depression of the switch S2 by the operator will complete a circuit between a second input of the PLC 40 and the source 50, thereby causing the PLC 40 to execute the "drop" cycle of the controller 26.

Figure 3:
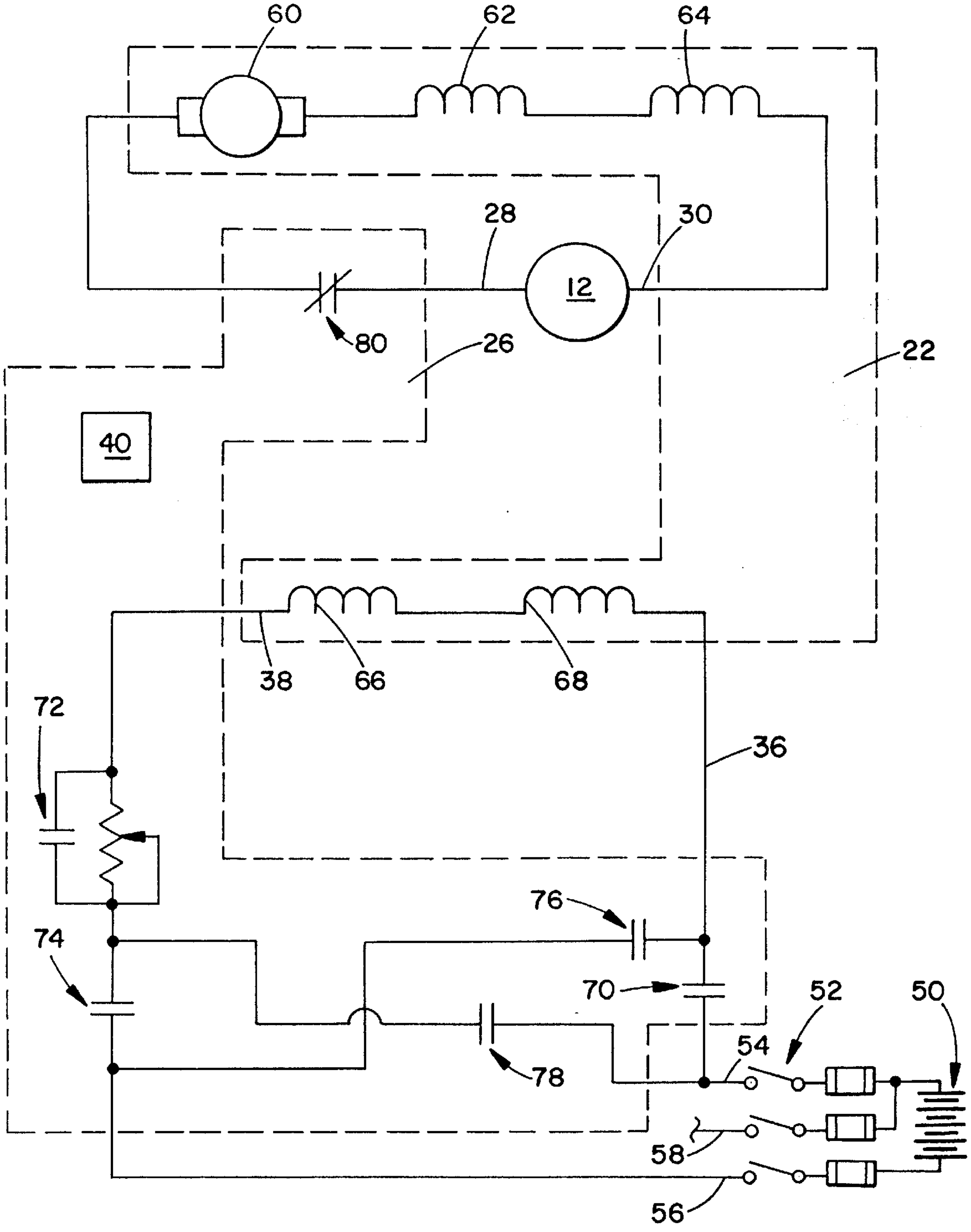
FIG. 3 schematically illustrates a lifting magnet controller circuit and a generator circuit in accordance with the present invention.

With reference now also to FIG. 3, the magnet controller 26, the generator 22, and the relationship between the controller 26 and the generator 22 are shown in detail. The generator 22 can be any suitable DC generator that is separately excited—i.e., the generator 22 is the type that requires the shunt fields (also referred to as "shunt field windings" and "field windings") to draw current from a external voltage source in order "excite" the generator so that it produces DC electricity at its output 23. Although not required, the generator 22 is preferably a compound wound generator that supplies an essentially constant output voltage even as the load connected to the generator 22 varies.

The generator 22 includes an armature 60 which is rotatably driven through a connection to the engine 20 or the optional auxiliary engine 24 of the prime mover 10. Preferably, as is described in detail below, the armature 60 of the generator 22 is connected to a hydraulic motor powered by a constant flow of hydraulic fluid from a hydraulic pump driven by an engine 20,24 of the prime mover 10. The preferred generator 22, as shown herein, includes a commutator field 62 and a series field 64 in series with the armature 60. The generator 60 also includes first and second shunt fields 66,68. As is known in the art of DC generators, when current is passed through the shunt fields 66,68, magnetic flux is established in the air gap between the armature 60 and the shunt fields 66,68.

Rotation of the armature 60 through the magnetic flux induces a voltage in the armature 60 as a result of the relative motion between the armature 60 and the air gap flux. A commutator rectifies the induced voltage and carbon brushes connect the armature 60 to the generator output 23. However, if no current is passing through the shunt fields 66,68 of the generator 60, rotation of the armature 60 does not induce a voltage in the armature 60. Thus, when the shunt fields 66,68 are not energized, the generator produces no output voltage at the output 23. Furthermore, the direction and magnitude of the current in the shunt fields 66,68 controls the polarity and the magnitude of the voltage induced in the armature 60.

In general, the magnet controller 26, in accordance with the present invention, selectively energizes the magnet 12 for lifting operations by selectively passing current through the shunt fields 66,68 of the generator 22. This eliminates the need to repeatedly open and close high voltage contacts between the magnet 12 and the output 23 of the generator 22 as is performed in prior art magnet controllers. Instead, as is shown in FIG. 3, the magnet controller 26 includes a plurality of contacts or "contactors" 70,72,74,76,78 (70–78) which are opened and closed by the PLC 40 to selectively connect the shunt fields 66,68 to the power source 50. The magnet controller 26 also includes a contactor 80 which selectively completes a circuit between the generator output 23 and the magnet 12. The contactor 80 is preferably normally closed.

As mentioned above, the power source 50 used to selectively energize or excite the shunt fields 66,68 of the generator 22 is relatively low voltage, preferably approximately 24 volts DC. Therefore, little or no arcing occurs when the contactors 70,72,74,76,78 of the controller 26 are opened and closed. The contactor 80 is preferably always closed before the shunt fields 66,68 are energized, and preferably never opened before the shunt fields 66,68 are deenergized. Thus, the contactor 80 is not opened and closed when the generator 22 is supplying power to the magnet 12. Various conventional contactors 70–80 may be used in the magnet controller 26. Suitable contactors include 200 Ampere normal current carrying contactors with a maximum resistance load break rating of 200 Amperes at 50 volts D.C. Each contactor 70–80 is electrically connected to and selectively opened and closed by the PLC 40 in accordance with the method of the present invention.

Figure 4:
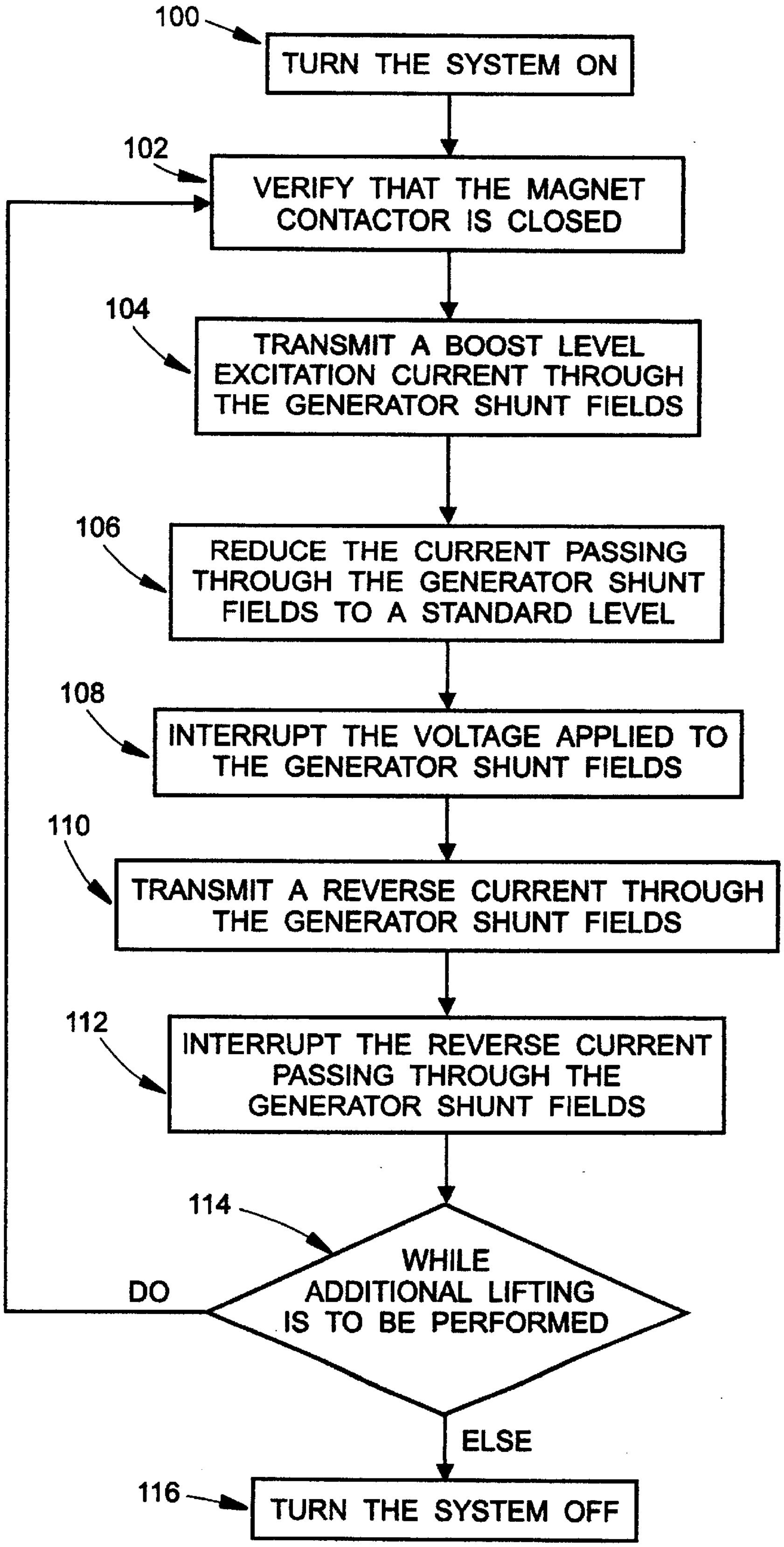
FIG. 4 is a flow chart showing a method for controlling a lifting magnet in accordance with the present invention.

FIG. 4 shows a method of controlling a lifting magnet 12 in accordance with the present invention. FIGS. 5–11 show the opening and closing of the various contactors 70–80 of the controller 26 along with the opening and closing of the main switch 52 as the method shown in FIG. 4 is carried out. The outline of the generator 22 has been omitted from FIGS. 5–11, but those skilled in the art will recognize that the armature 60, the commutator field 62, the series field 64, and the shunt fields 66,68 are contained within the generator 22 as shown in FIG. 3. Of course, before the system 27 can be operated as described below, the prime mover 10 is preferably turned on and the armature 60 of the generator 22 is rotatably driven.

Figure 5:
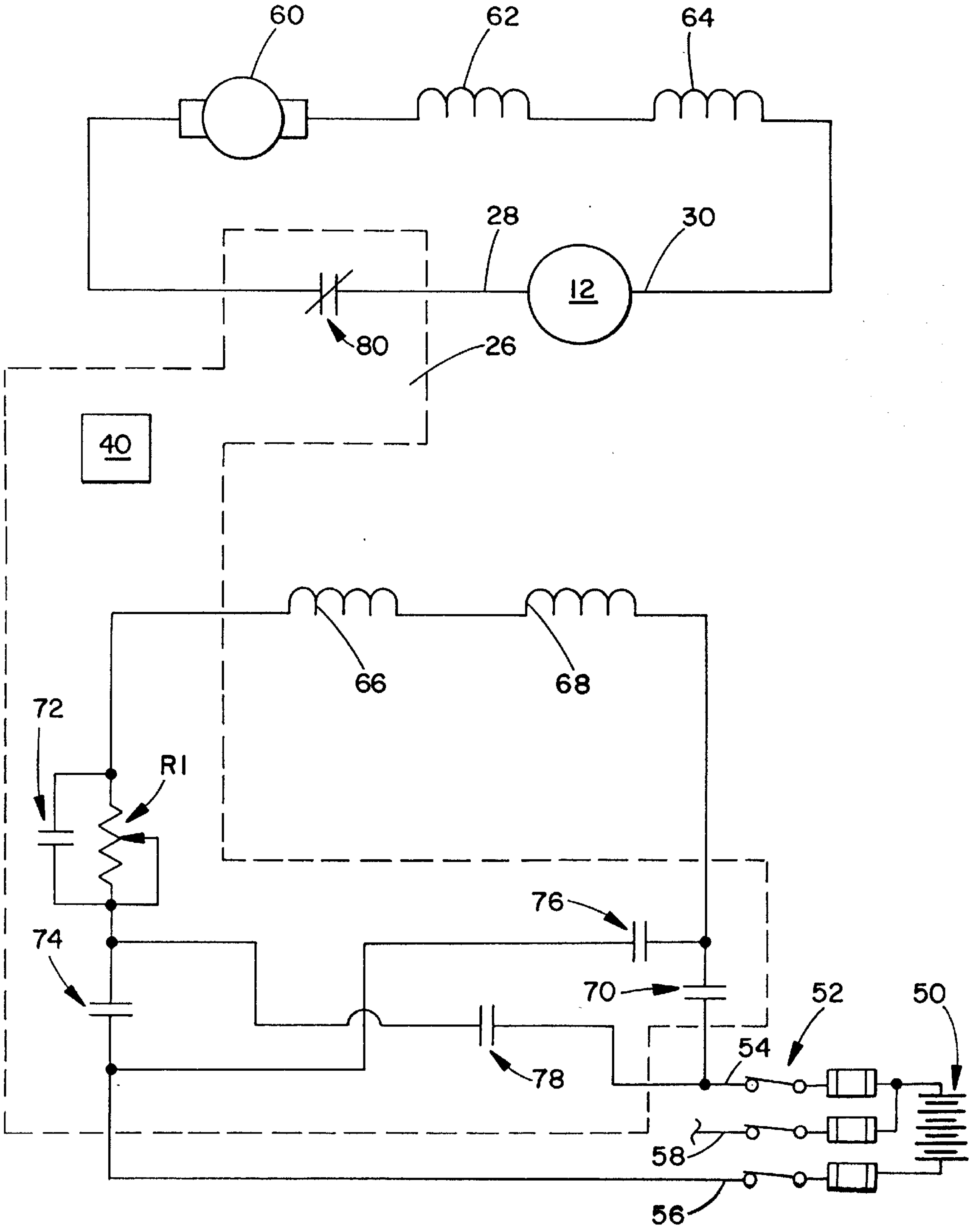
FIGS. 5–11 illustrate the various states of the circuit of FIG. 3 as the method shown in FIG. 4 is carried out.

With reference to FIGS. 4 and 5, a step 100 turns the system 27 on using the main switch 52. This step is typically performed manually. As is seen in FIG. 5, the step 100 results in the closure of the switch 52 such that the power source 50 is connected to the magnet controller 26 through the electrical connections 54,56. Closure of the main switch 52 also connects the switches S1,S2 (FIG. 2) on the levers 16,18 to the power source 50 through the electrical connection 58. Until the step 100 is carried out to turn the system on, the magnet control system 27 is inoperable.

Although the magnet contactor 80 that selectively connects the output 23 of the generator 22 to the magnet 12 is a normally closed contactor, a step or means 102 verifies that the magnet contactor 80 is closed. If the contactor 80 is open, the step or means 102 closes it. This step is performed by the PLC 40. It is important to ensure that the contactor 80 is closed at this point to eliminate the need to close the contactor 80 when there exists a large voltage across the tips thereof which would result in voltage spikes and arcing. Using the method of the present invention, it is also possible to eliminate the magnet contactor 80 altogether, although such is not preferred.

When a lifting magnet 12 is used to lift a load, it is generally preferable to supply the magnet 12 with an initial boost of high power for a brief period of time and to thereafter reduce the power to the magnet 12 to maintain the load on the magnet. For example, a boost voltage of 275 volts DC can be applied to the magnet 12 for a period of approximately three seconds. Thereafter, the power to the magnet 12 can be reduced to 230 volts DC to hold the load. Of course, the actual boost time can vary for the particular magnet 12 and the particular material being handled thereby.

Figure 6:
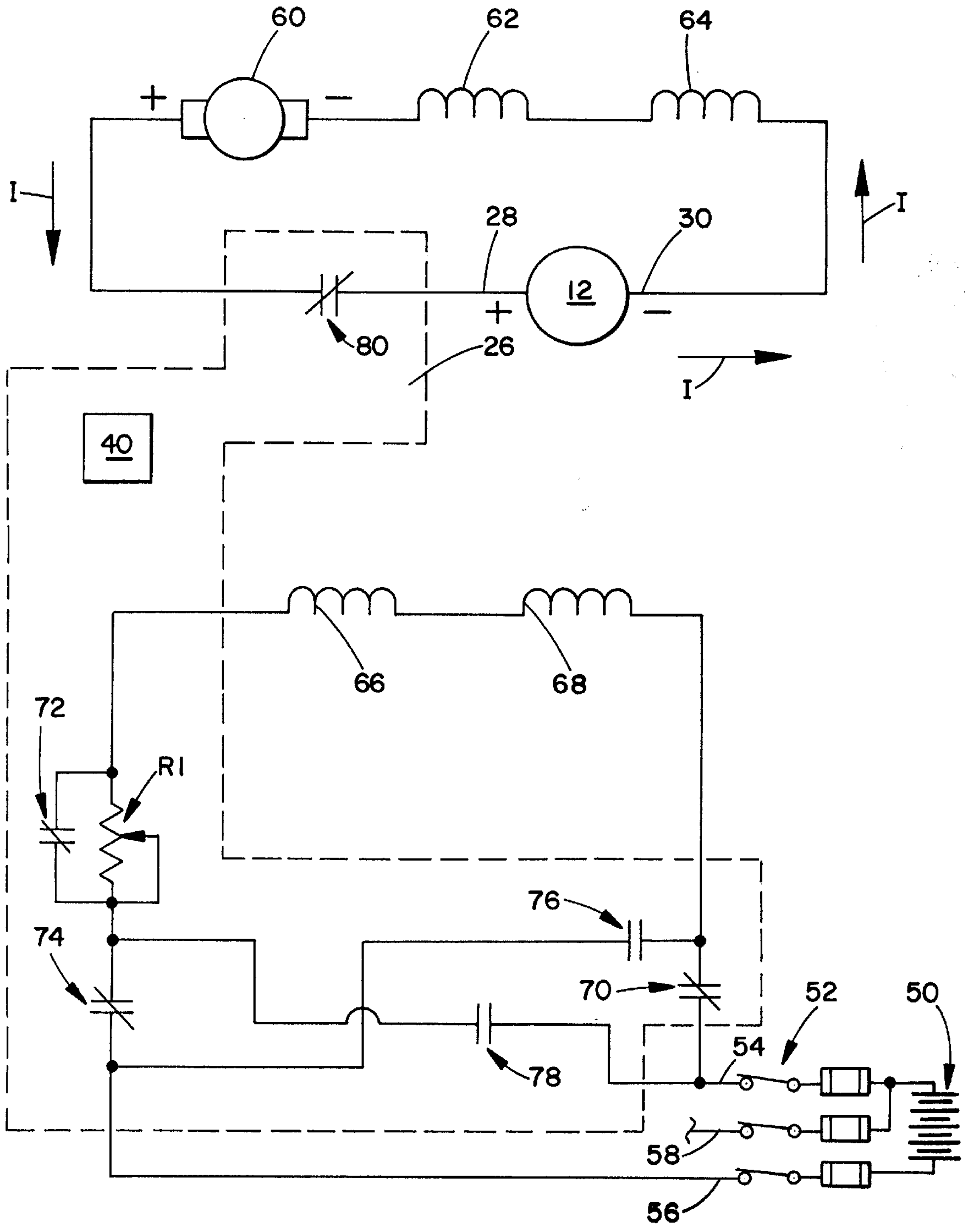

Therefore, when the operator initiates a lift by pressing the switch Sl on the lever 16, a step or means 104 transmits a boost level excitation current through the generator shunt fields 66,68. This boost level current passing through the shunt fields 66,68 causes a corresponding boost in the output of the generator 22. This boost step 104 is preferably carried out as shown in FIG. 6 wherein the contactors 70,72,74 are closed by the PLC 40 in response to the operator depression of the switch SI. The closure of the contactors 70,72,74 completes a circuit from the power source 50 through the shunt fields 66,68. Closing the contactor 72 partially bypasses a resistor R1 to lower the total resistance in the circuit and thus increase the level of current passing through the fields 66,68. At this stage, current passes through the magnet 12 in a first direction as indicated by the arrows I to establish a first magnetic polarity (indicated with conventional (+) and (−) symbols) in the magnet 12.

Figure 7:
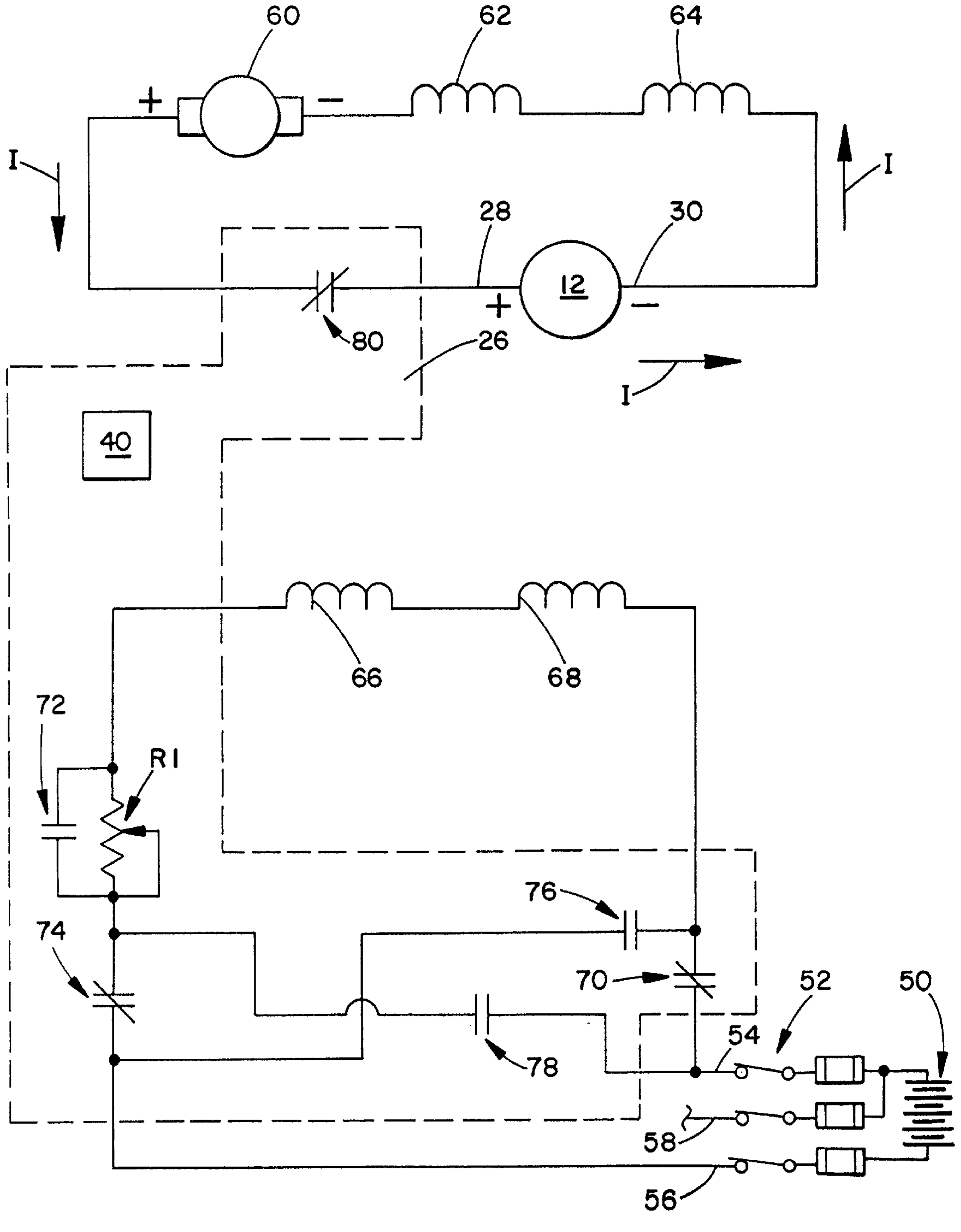

As mentioned, the boost stage is relatively short in duration. Thus, a step or means 106 preferably reduces the current passing through the shunt fields 66,68, thereby causing a corresponding decrease in the output of the generator 22 and the power transmitted to the magnet 12. The step or means 106 is preferably carried out as shown in FIG. 7. The PLC 40 is programmed with the desired boost time. After the passage of this select boost time, the PLC 40 opens the contactor 72 such that the resistor R1 is no longer partially bypassed. This increases the resistance in the circuit and decreases the current flowing through the fields 66,68 and thus decreases the output of the generator 22.

Figure 8:
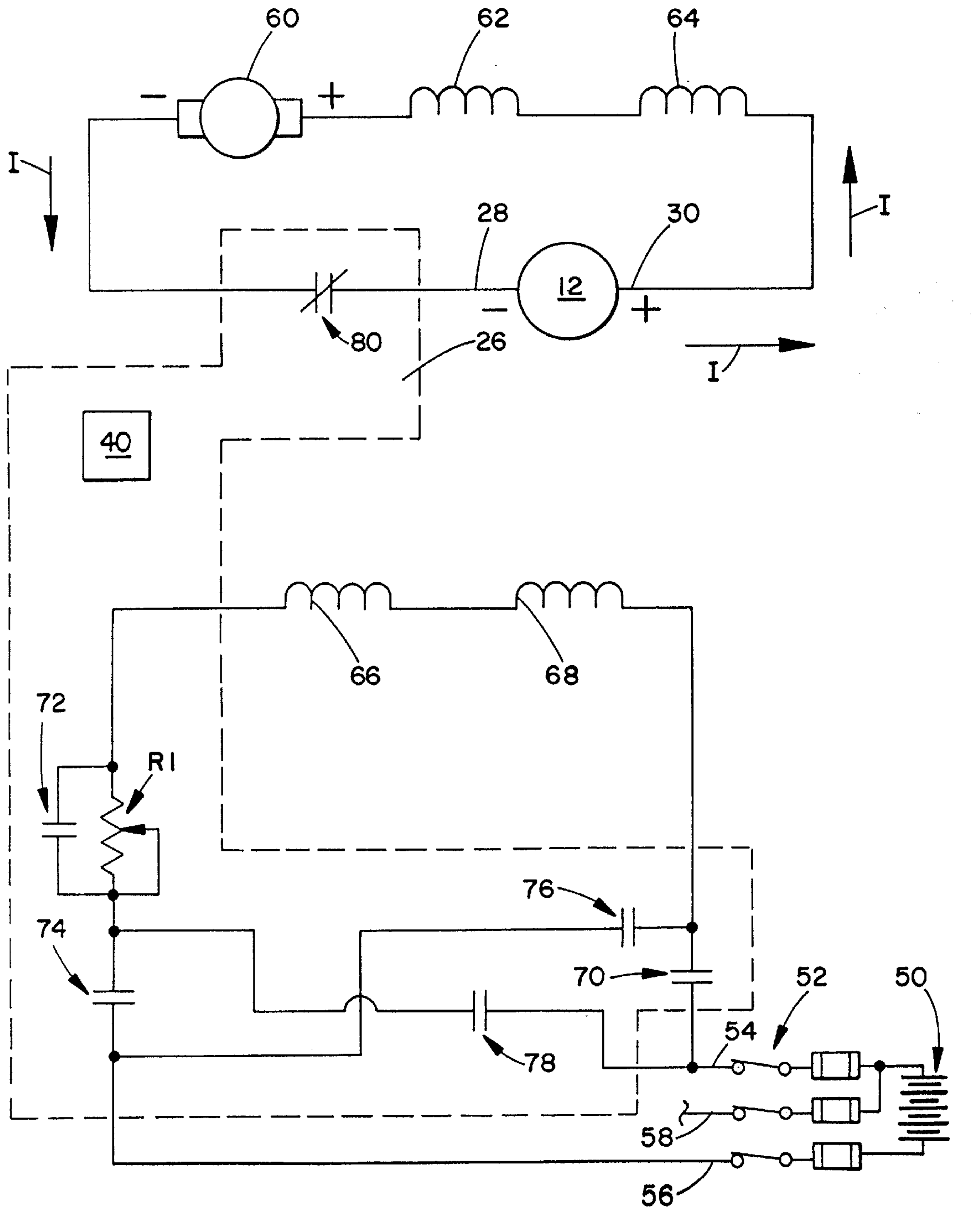

When it is time to drop the load, a step or means 108 interrupts the voltage to the generator shunt fields 66,68 to cut the flow of current therethrough. This preferably occurs in response to operator depression of the switch S2 on the lever 18. As is shown in FIG. 8, closure of the switch S2 causes the PLC 40 to open the contactors 70,74 to disconnect the shunt fields 66,68 from the voltage source 50. With a separately excited generator 22, there is no voltage is present at the output 23 unless current is passing through the shunt fields 66,68. Therefore, power to the magnet 12 is interrupted by the step 108 without having to open the magnet contactor 80. When power to the magnet 12 is cut, the residual magnetism in the magnet 12 induces a current through the magnet 12, as indicated by the arrows I, which is dissipated through the armature 60 and other components of the generator 22 which are in series with the magnet 12.

Figure 9:
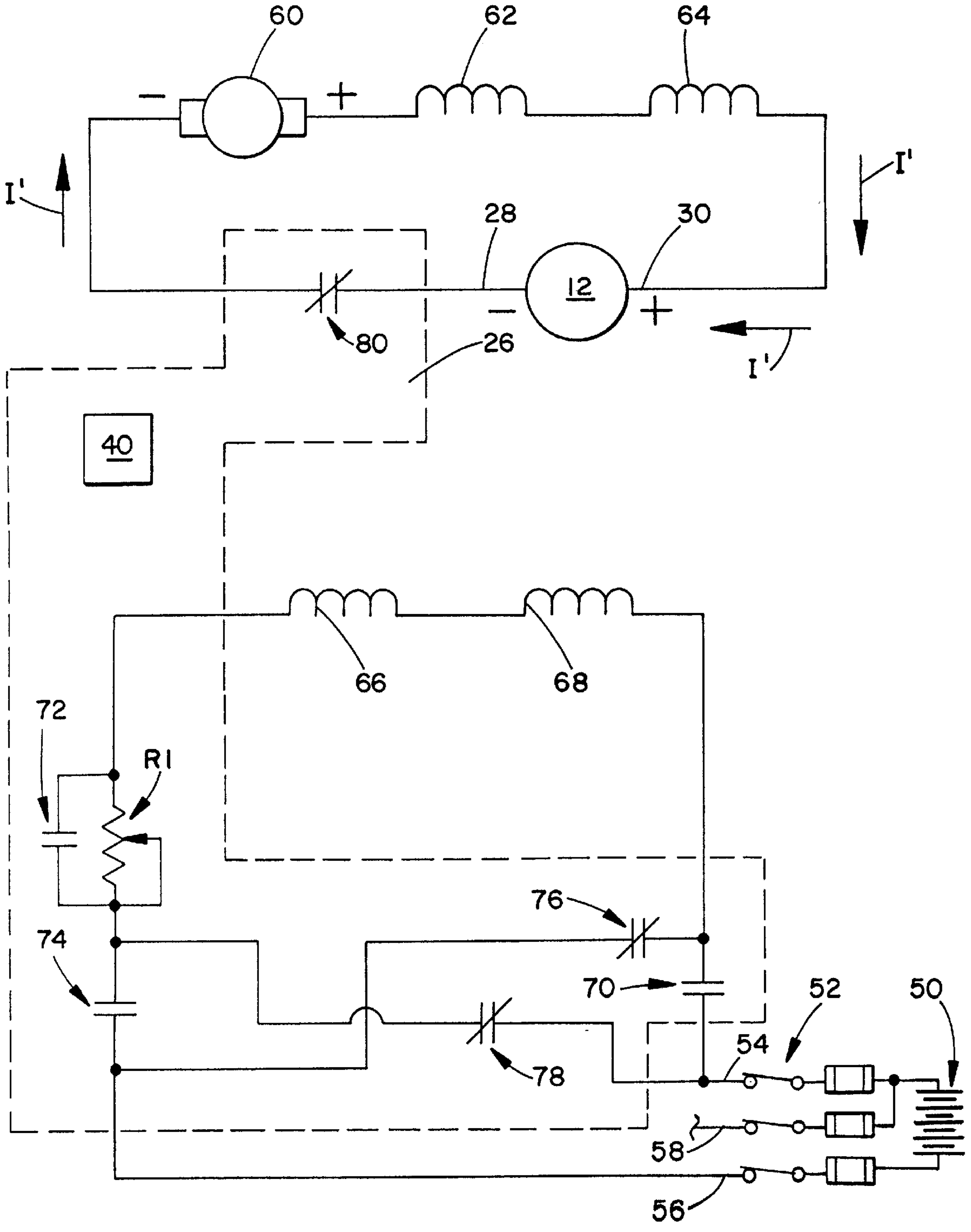

Although the load carried by the magnet 12 should drop under the force of gravity upon the power to the magnet 12 being interrupted at step 108, it is preferably to immediately reverse the polarity of the magnet 12 for a brief time—known as the "drop time", to "push" the load off of the magnet 12. The reversal of polarity in the magnet 12 must be brief or else the load will be attracted once again to the magnet 12. Also, the drop varies depending upon the particular magnet 12 and upon the particular load being lifted thereby. Therefore, a step or means 110 transmits a reverse current through the shunt fields 66,68 of the generator 22. This results in a reversal of the polarity of the voltage at the output 23 of the generator 22 and a reversal of direction in the current flowing through the magnet 12. As is shown in FIG. 9, the PLC 40 closes the contactors 76,78 to complete a circuit between the shunt fields 66,68 and the power source 50 wherein the orientation of the source 50 in the circuit is reversed compared to the orientation shown in FIGS. 6 and 7. This causes a reverse current to flow through the shunt fields 66,68 which consequently reverses the polarity of voltage output by the generator 22. The reversal of polarity of the generator output voltage causes a reverse current I' to flow through the magnet 12. This reverses the polarity of the magnet and pushes the load from the magnet 12.

With reference to FIG. 2, the drop time of the magnet controller 26 is controlled by the operator using a drop time control 81 positioned on the control panel 19. Using the control 81, the operator can select a drop time in the PLC 40. The drop time can be easily adjusted by the operator without assistance and without leaving the cab 14 of the prime mover 10. The drop time generally needs to be adjusted when the magnet 12 is first connected to the prime mover 10 or when the type of load being moved varies.

Figure 10:
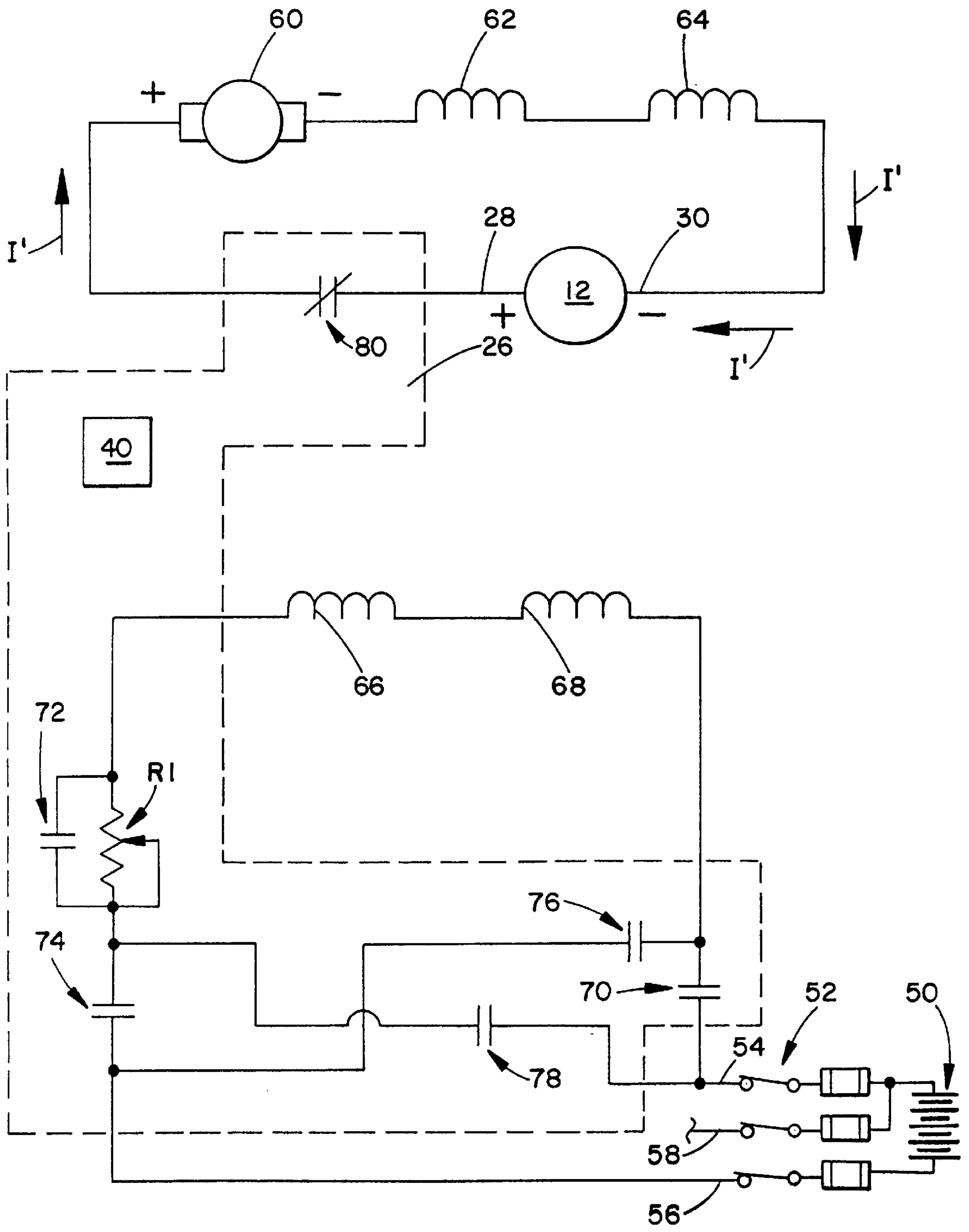
Figure 11:
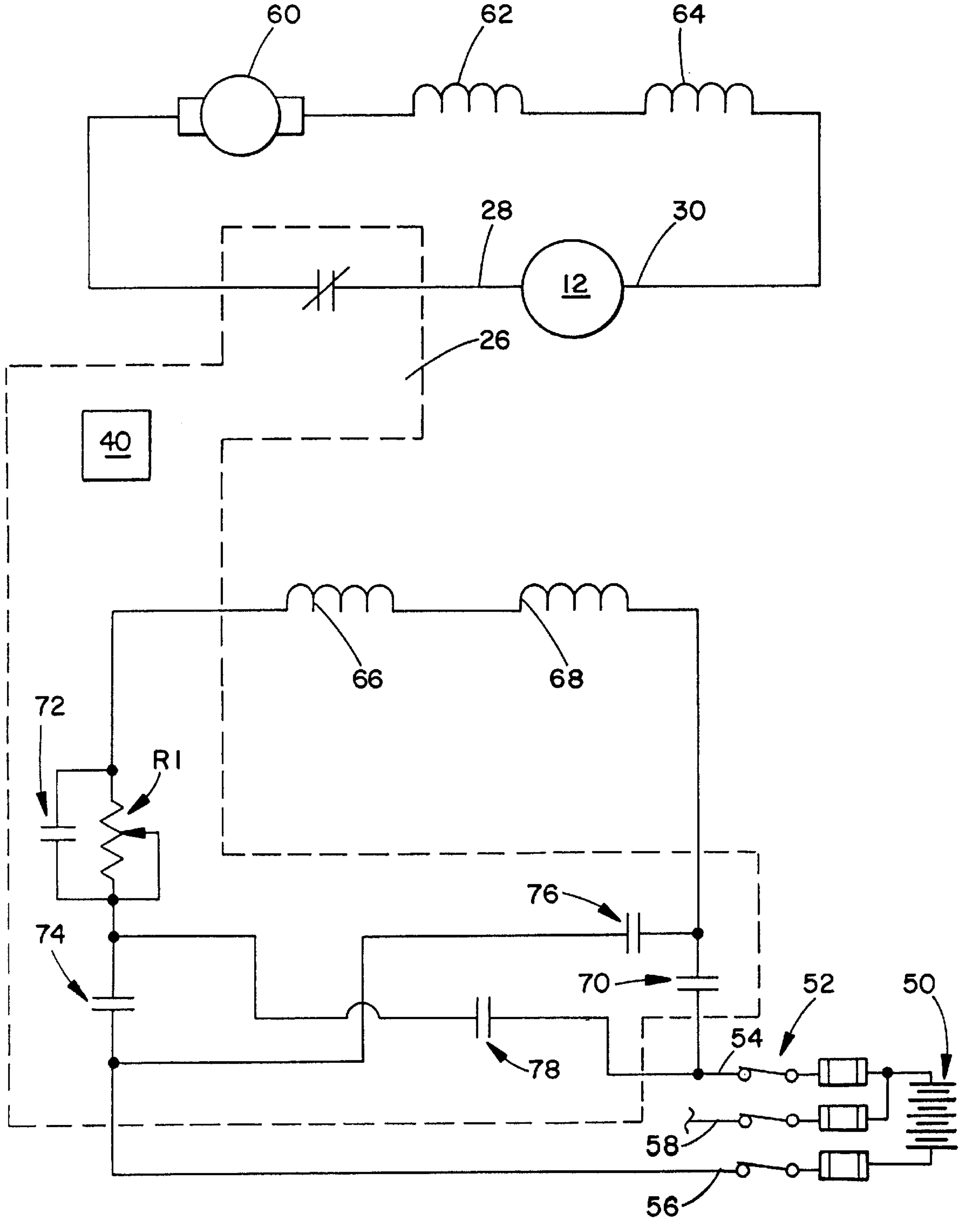

After the passage of the selected drop time, a step or means 112 interrupts the reverse current flowing through the generator shunt fields 66,68. This is preferably carried out as shown in FIG. 10, wherein it can be seen that the PLC 40 opens the contactors 76,78 to break the circuit and stop the flow of current through the shunt fields 66,68. Residual magnetism in the magnet 12 induces a current to flow through the magnet as indicated by the arrows I'. This residual current dissipates over a brief time, and as is shown in FIG. 11, the magnet is once again demagnetized without the magnet contactor 80 having been opened. As is indicated in FIG. 4 at 114, while additional lifting is to be performed, the process begins again with step 102. Otherwise, step 116 turns the system off by opening the main switch 52 to remove the voltage source 50 from the circuit (FIG. 3).

Figure 12:
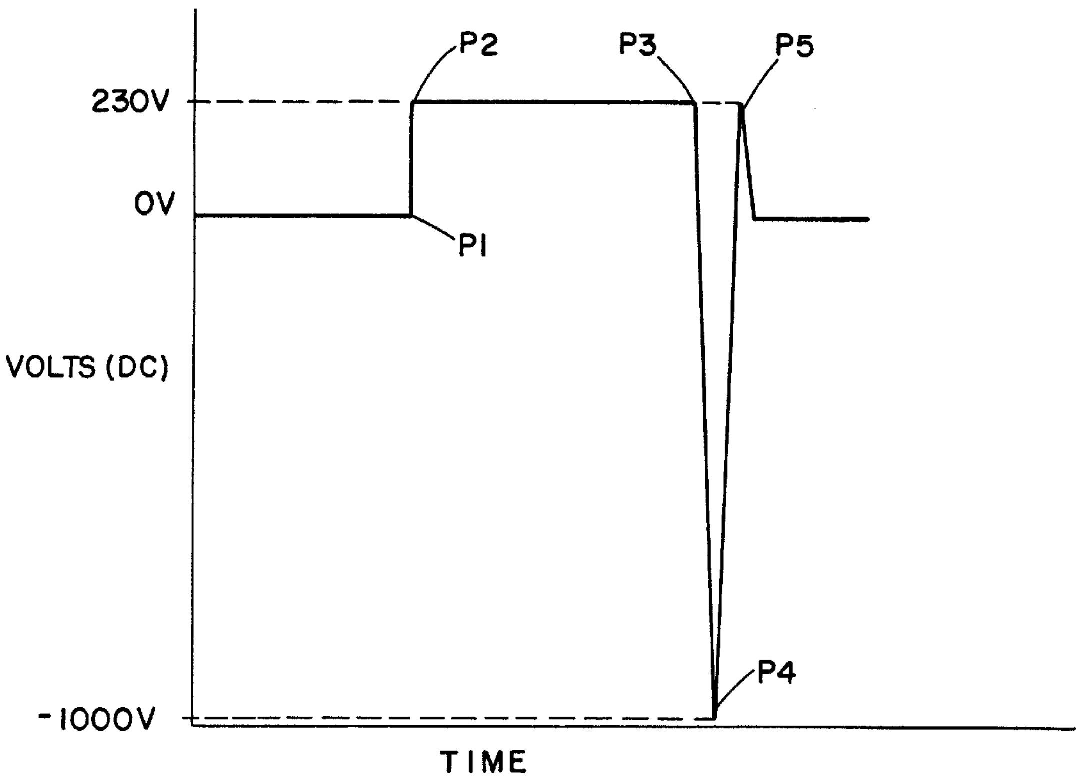
FIG. 12 (PRIOR ART)
FIG. 12 graphically shows a voltage signal associated with a typical prior art lifting magnet controller as the lifting magnet is operated through a lift and drop cycle.

FIG. 12 graphically illustrates the undesirable voltage spikes that occur in typical prior art magnet controllers and control systems in a lift and drop cycle. The boost level voltage is omitted for clarity. The magnet is energized at point P1 with 230 volts. Once the 230 volts is present at point P2, the voltage level to the magnet remains constant. At point P3, the polarity of the voltage to the magnet is briefly reversed to push the load from the magnet. However, with known controllers, this reversal of magnet polarity causes a large reverse voltage spike P4. Often, as shown in FIG. 12, the voltage spike P4 is approximately −1000 volts. Furthermore, it can be seen in FIG. 12 that, before returning to 0 volts, the voltage climbs back to 230 volts at point P5.

Figure 13:
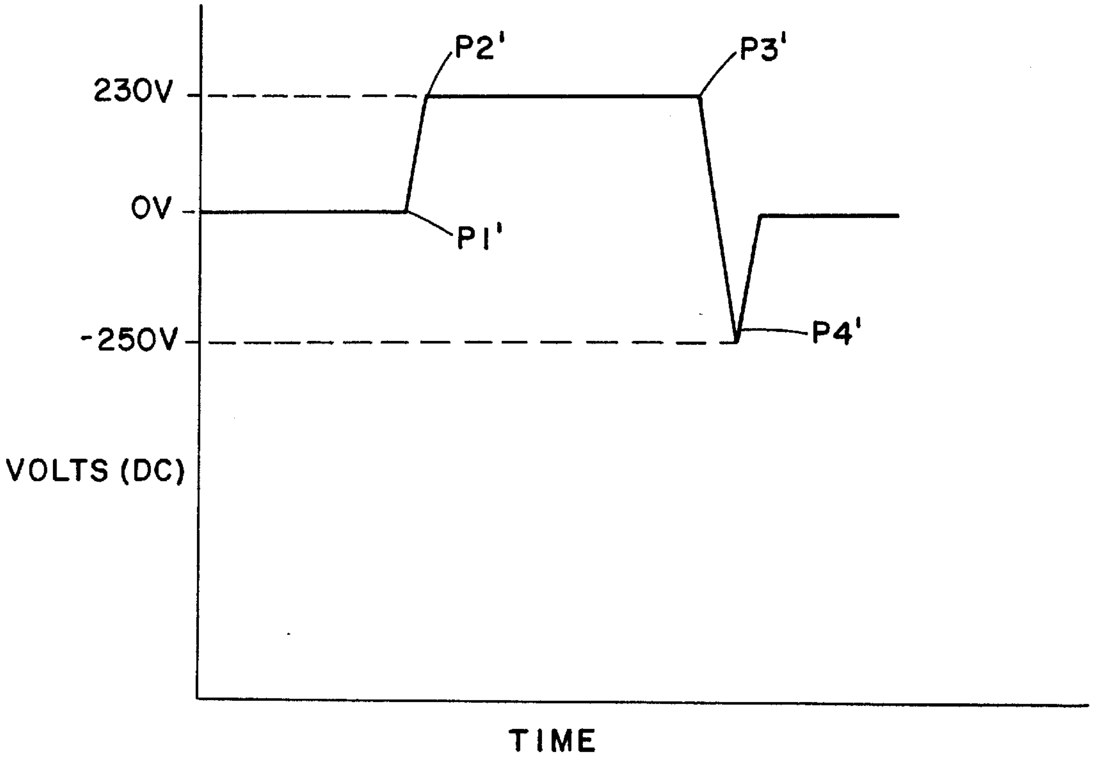
FIG. 13 graphically shows a voltage signal associated with a lifting magnet controller of the present invention as the lifting magnet is operated through a lift and drop cycle.

In contrast, FIG. 13 graphically illustrates the voltage levels associated with the magnet control system 27 and method of the present invention in a typical lift and drop cycle. Again, the boost level voltage is omitted for clarity. The shunt fields 66,68 are energized at point P1' and the voltage output to the magnet climbs to 230 volts at point P2'. The voltage remains constant until point P3' where the current to the generator shunt fields 66,68 is interrupted. Immediately thereafter, a reverse current is passed through the shunt fields 66,68 to reverse the polarity of the voltage output from the generator 22. This causes the voltage level to drop and reverse to point P4' which is approximately −250 volts. Once the reverse current through the shunt fields 66,68 is interrupted, the voltage output by the generator goes to 0 volts without first returning to 230 volts. It can be seen from FIGS. 12 and 13 that the apparatus and method of the present invention eliminate wide voltage fluctuations and spikes associated with known magnet controllers.

The elimination of voltage spikes and arcing in the magnet controller 26 allows the contactors 70–80 to be made smaller in size. Furthermore, only the contactor 80 directly passes current to the magnet 80. Therefore, for example, the magnet controller 26 of the present invention can be safely utilized with magnets that vary from a small magnet such as a 5 kW, 30 inch, 20 Ampere magnet to a large magnet such as a 40 kW, 93 inch, 175 Ampere magnet.

Preferably, the generator 22 is powered by a hydraulic motor. With known systems, the hydraulic motor receives a flow of hydraulic fluid directly from a hydraulic pump provided to drive a generator or other accessories of the prime mover 10. With known systems, variations in the speed of the engine driving the hydraulic pump of the prime mover 10 results in corresponding variations in the flow of hydraulic fluid from the hydraulic pump to the generator powering the lifting magnet. This consequently causes fluctuations in generator speed and the voltage transmitted to the lifting magnet.

Figure 14:
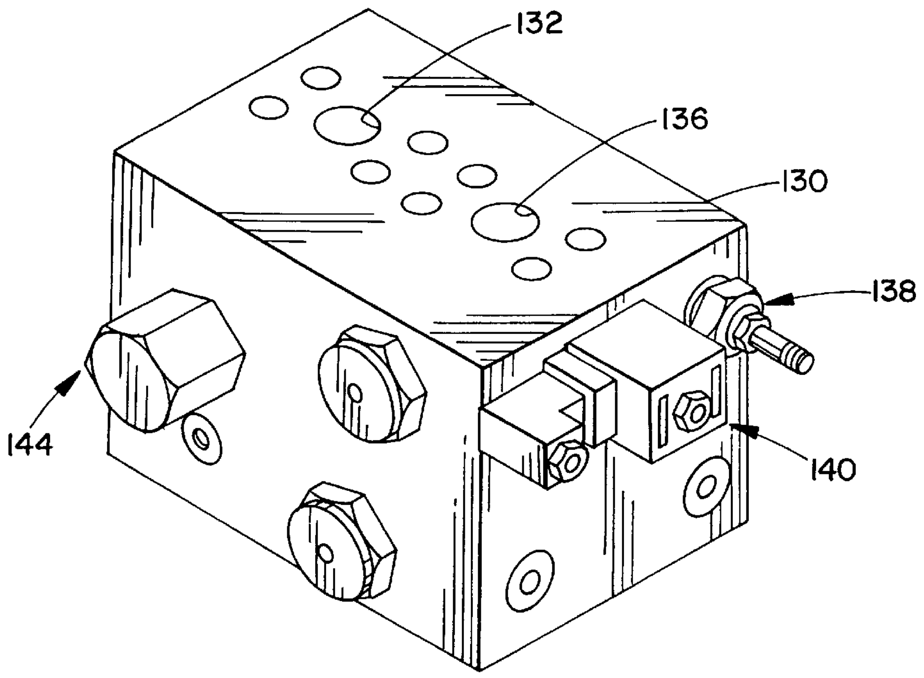
FIG. 14 is a perspective view of a hydraulic fluid manifold in accordance with the present invention; and, FIG. 15 is a schematic illustration of the manifold of FIG. 14 as it is connected between a hydraulic pump of the prime mover carrying the lifting magnet and a hydraulic motor powering the a DC generator supplying electrical power to the lifting magnet.
Figure 15:
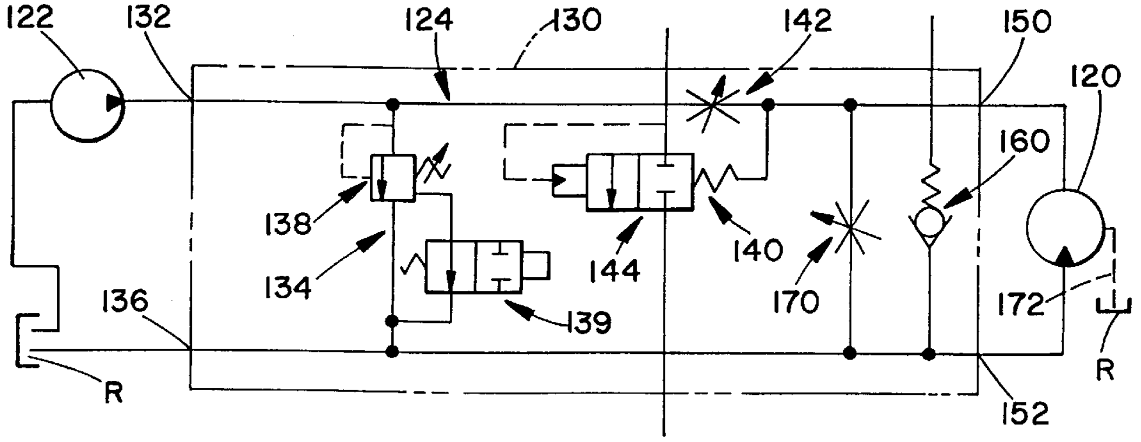

Therefore, another aspect of the present invention is illustrated in FIGS. 14 and 15. The generator 22 of the present system 27 is preferably driven by a hydraulic motor 120. The hydraulic motor is connected to a hydraulic pump 122 of the prime mover 10 through a hydraulic circuit 124. The pump is driven by an engine 20,24 of the prime mover 10. The hydraulic circuit 124 is preferably defined in a manifold 130 which may be aluminum or any other suitable material. The circuit 124 regulates the flow of hydraulic fluid to the hydraulic motor 120 and thus ensures that the armature 60 of the generator 22 rotates at an essentially constant speed, independent of the speed of the pump 122 to thus regulate the voltage output of the generator 22.

Specifically, the pump 122 of the prime mover generally produces excess flow of hydraulic fluid. The pump 122 pumps fluid from a reservoir R to a manifold inlet 132. The manifold includes a relief valve assembly 134 that can either act as a conventional relief valve to limit the maximum hydraulic pressure in the circuit 124 or can be set to divert all of the fluid flow from the pump 122 directly to the outlet 136 of the manifold 130.

The relief valve assembly 134 thus includes an adjustable vented relief valve 138 and a solenoid valve 136. When the solenoid 136 is energized, the vent of the relief valve is closed and the relief valve 138 acts as a conventional pressure relief valve which opens only when the upstream pressure reaches a set threshold. When the solenoid 139 is deenergized, the relief valve 138 is vented and opens at "zero" pressure and thus diverts all fluid from the pump 122 immediately back to the reservoir R to cut the flow of fluid to the hydraulic motor 120.

When the relief valve assembly 134 is set to act as a conventional relief valve, fluid that is not diverted by the relief valve assembly 134 reaches a pressure compensated flow control valve assembly 140. The assembly 140 includes an adjustable flow control valve 142 that regulates the flow of hydraulic fluid to the motor 120. The assembly 140 also includes a pressure compensator 144 that ensures a select pressure differential across the flow control valve 142 such that the flow through the valve 142 remains at least essentially constant. For example, a pressure differential of approximately 135 to approximately 165 pounds per square inch (p.s.i.) can be maintained across the flow control valve 142. This constant flow through the pressure compensated flow control valve assembly 140 ensures an essentially constant rotational speed of the motor 120 and thus, the armature 60 of the generator 22. This is so, even if the output of the pump 122 increases.

The hydraulic motor 120 is connected to a motor outlet 150 of the manifold 130. Fluid passes through and drives the motor 120 and returns into the manifold 130 at a motor return port 152. Fluid from the motor inlet flows back to the reservoir R. When the flow of fluid to the motor 120 is interrupted, the motor will continue to rotate for a time. To ensure that the motor does not pump itself dry or pump large volumes of air into the circuit 124, the circuit preferably includes an anti-cavitation valve 160 that allows the motor 120 to recirculate fluid to itself when the pump 122 is stopped or when the relief valve assembly 134 is opened to divert fluid to the reservoir R.

The adjustable flow control valve 142 is set such that a predetermined flow of hydraulic fluid is delivered to the hydraulic motor 120. However, it has been found that in certain instances, for example when a light flow of hydraulic fluid is needed at the motor 120 (as is required when a smaller magnet 12 is being used), the pressure compensator 144 has difficulty in accurately regulating the pressure upstream and downstream of the flow control valve 142. Therefore, the manifold 130 optionally includes an adjustable cross-over flow control valve 170 that diverts or "bleeds" a small amount of hydraulic fluid from the circuit 124 between the flow control valve 142 and the motor 120. This prevents surges in the circuit 124 and helps the pressure compensator 144 to regulate the pressure at the flow control valve 142. Finally, as is known in the art of hydraulics, the motor 120 includes a case drain line 172 to prevent the build-up of excessive hydraulic pressure in the motor housing.

The invention has been described with reference to preferred embodiments. Obviously, modifications and alterations will occur to others upon reading and understanding the preceding specification. It is intended that the invention be construed as including all such modifications and alterations insofar as they come within the scope of the appended claims or the equivalents thereof.

Having thus described the preferred embodiments, the invention is now claimed to be:

1. A method of selectively energizing a lifting magnet of a materials handling machine, said method comprising:

(a) connecting said lifting magnet to a voltage output of a separately excited generator, said generator including shunt field windings;

(b) rotating an armature of said generator;

(c) selectively connecting said shunt field windings of said generator to an electrical power source to pass an electrical current through said shunt field windings and excite said generator to establish a voltage at said output of said generator;

(d) maintaining a record of the amount of time said lifting magnet is energized by said generator voltage output relative to the total time said magnet is in use; and (e) notifying an operator of said lifting magnet if said lifting magnet is energized more than a predetermined percentage of the total time said magnet is in use.

2. The method as set forth in claim 1, wherein said step (c) comprises the substeps:

(c1) connecting said shunt field windings to said power source in a first orientation to pass an electrical current through said shunt field windings in a first direction; and thereafter (c2) connecting said shunt field windings to said power source in a second orientation to pass an electrical current through said shunt field windings in a second direction opposite said first direction.

3. The method as set forth in claim 1, wherein said step (c) comprises the substeps:

(c1) connecting said shunt field windings of said generator to said electrical power source to pass a first electrical current of a first magnitude through said shunt field windings; and thereafter, (c2) connecting said shunt field windings of said generator to said electrical power source to pass a second electrical current of a second magnitude through said shunt field windings, said first current having a magnitude greater than said second current.

4. The method as set forth in claim 3, wherein said first and second currents pass through said shunt field windings in the same direction, said method further comprising, after step (c2):

(c3) connecting said shunt field windings to said electrical power source to pass a third electrical current through said shunt field windings for a select duration, said third current having a direction opposite said first and second currents.

5. The method as set forth in claim 1, further comprising:

(f) continuously monitoring a circuit interconnecting said lifting magnet and said generator output for the existence of a ground; and (g) notifying an operator of said lifting magnet upon sensing a ground in said circuit interconnecting said lifting magnet and said generator output.

6. The method as set forth in claim 1, further comprising:

(f) continuously monitoring the electrical voltage level at said generator voltage output; and, (g) notifying an operator of said lifting magnet if said voltage level is not within a predetermined range.

7. A method of controlling a lifting magnet, said method comprising:

connecting said lifting magnet to a voltage output of a separately excited generator, said generator including shunt field windings;

rotating an armature of said generator;

selectively connecting said shunt field windings of said generator to an electrical power source to pass an electrical current through said shunt field windings and excite said generator to establish a voltage at said output of said generator;

positioning a temperature sensor in said generator to monitor the temperature of said generator;

receiving a temperature signal from said temperature sensor;

comparing said received temperature signal with a threshold temperature signal value indicative of a maximum acceptable temperature for said generator; and, notifying an operator of said lifting magnet if said temperature of said generator exceeds said maximum acceptable temperature value by outputting an over-temperature signal.

8. A method of selectively supplying electrical power to a lifting magnet of a materials handling machine including an internal combustion engine, said method comprising:

connecting the lifting magnet to a voltage output of a separately excited generator, said generator including shunt field windings;

using the internal combustion engine of the materials handling machine to drive a hydraulic pump at different speeds with the internal combustion engine so that the hydraulic pump outputs a flow of hydraulic fluid that varies with the speed of the internal combustion engine;

passing hydraulic fluid from the hydraulic pump through a pressure compensated flow control valve assembly to provide an essentially constant flow of hydraulic fluid at an output of the pressure compensated flow control valve assembly;

fluidically connecting a hydraulic motor to the output of the pressure compensated flow control valve assembly so that the hydraulic motor is driven by the essentially constant flow of hydraulic fluid at an essentially constant speed;

driving an armature of the generator at an essentially constant speed with the hydraulic motor; and, selectively connecting the shunt field windings of the generator to an electrical power source to pass an electrical current through the shunt field windings and excite the generator so that rotation of the armature establishes an electrical voltage at the output of the generator.

9. A materials handling apparatus comprising:

a prime mover;

a separately excited generator including a rotatable armature, shunt field windings, and a voltage output for connection to a lifting magnet;

an excitation power source;

means for selectively connecting said shunt field windings to said excitation power source and exciting said generator so that voltage is established at said voltage output;

a hydraulic pump driven by an engine of said prime mover; and, a hydraulic motor in fluid communication with said hydraulic pump and drivingly connected to said armature.

10. A materials handling apparatus comprising:

a prime mover;

a separately excited generator including a rotatable armature, shunt field windings, and a voltage output for connection to a lifting magnet;

a hydraulic pump driven by an engine of said prime mover;

a hydraulic motor in fluid communication with said hydraulic pump and drivingly connected to said armature; and, a hydraulic manifold connecting said hydraulic pump in fluid communication with said hydraulic motor, said hydraulic manifold defining a hydraulic circuit including means for delivering an essentially constant flow of hydraulic fluid from said hydraulic pump to said hydraulic motor independent of the speed of said hydraulic pump.

11. The materials handling apparatus as set forth in claim 10, wherein said manifold comprises a pressure compensated flow control valve assembly for delivering a select flow of hydraulic fluid from said hydraulic pump to said hydraulic motor.

12. A materials handling apparatus comprising:

a prime mover;

a separately excited generator connected to the prime mover and including a rotatable armature, shunt field windings, and a voltage output for connection to a lifting magnet;

means for rotating said armature of said generator;

a battery for supplying a DC excitation voltage; and means for selectively connecting said shunt field windings of said generator to said battery and exciting said generator such that electrical current flows through said shunt field windings and voltage is established at said generator voltage output, said means for selectively connecting said shunt field windings comprising a magnet controller including a plurality of contactors for selectively completing an electrical circuit between said battery and said shunt field windings.

13. The materials handling apparatus as set forth in claim 12, wherein said magnet controller further comprises:

an electronic controller operatively connected to said plurality of contactors for selectively opening and closing said plurality of contactors in a predefined sequence.

14. The materials handling apparatus as set forth in claim 13, further comprising:

a drop time adjustment control positioned in an operator's cab of said prime mover and electrically connected to said electronic controller for operator adjustment of a drop time operation of said magnet controller.

15. A materials handling apparatus comprising:

a prime mover;

a separately excited generator including a rotatable armature, shunt field windings, and a voltage output for connection to a lifting magnet;

means for rotating said armature of said generator;

means for selectively exciting said shunt field windings of said generator such that voltage is established at said generator voltage output, said shunt field exciting means including: an electrical power source and a magnet controller having: (1) a plurality of contactors for selectively completing an electrical circuit between said electrical power source and said shunt field windings, and (2) an electronic controller for selectively opening and closing said plurality of contactors in a predefined sequence;

a plurality of visual indicators positioned in an operator's cab of said prime mover and electrically connected to said electronic controller, said indicators indicating to an operator of said prime mover at least two of: (i) a magnet power-on condition wherein the lifting magnet carried by said prime mover is energized; (ii) an over-voltage condition of said generator; (iii) an under-voltage condition of said generator; (iv) a ground between said generator output and the lifting magnet carried by said prime mover; (v) an excessive magnet duty cycle; and, (vi) a generator overheating condition.

16. A materials handling apparatus comprising:

a prime mover;

a separately excited generator including a rotatable armature, shunt field windings, and a voltage output for connection to a lifting magnet;

an excitation voltage source;

a generator excitation circuit including (i) a plurality of electrical contactors for selectively completing an electrical circuit between the shunt field windings and the excitation voltage source, and (ii) an electronic controller operatively connected to and controlling said plurality of contactors;

a hydraulic pump driven by an engine of said prime mover; and, a hydraulic motor in fluid communication with said hydraulic pump and drivingly connected to said armature.

17. The materials handling apparatus as set forth in claim 16 further comprising:

a pressure compensated flow control hydraulic circuit fluidically connecting said hydraulic pump to said hydraulic motor to provide a pressure compensated flow of hydraulic fluid from said pump to said motor.

18. An apparatus adapted for selectively lifting, carrying, and dropping magnetic material, said apparatus comprising:

an operator's cab including a control panel and first and second control levers for maneuvering said apparatus;

an internal combustion engine;

an electro-magnetic lifting magnet for selectively attracting and carrying a load of magnetic material;

a separately excited generator including shunt fields and a rotatable armature driven by said internal combustion engine through a hydraulic circuit, said circuit including (i) a hydraulic pump driven by said internal combustion engine; and, (ii) a hydraulic motor drivingly connected to rotate said armature;

an excitation voltage source;

a magnet controller for selectively connecting said shunt fields to said excitation voltage source, said magnet controller having a plurality of contactors selectively defining at least one of a lift circuit for connecting said shunt fields to said excitation source in a first polarity and a drop circuit for connecting said shunt fields to said excitation source in a second polarity;

a lift switch and a drop switch in said cab and operatively connected to said magnet controller for manipulation by an operator in said cab to place said magnet controller in one of a lift state defining said lift circuit and a drop stale defining said drop circuit, respectively.

19. The materials handling apparatus as set forth in claim 18 wherein said hydraulic circuit further comprise:

(iii) a pressure compensated flow control circuit to provide pressure compensated flow of hydraulic fluid from said hydraulic pump to said hydraulic motor.

* * * * *